United States Patent [19]

Kawasaki

[11] Patent Number: 5,185,761
[45] Date of Patent: * Feb. 9, 1993

[54] GPS RECEIVER

[75] Inventor: Kenichiro Kawasaki, Saitama, Japan

[73] Assignee: Pioneer Electronic Corporation, Tokyo, Japan

[*] Notice: The portion of the term of this patent subsequent to Oct. 22, 2008 has been disclaimed.

[21] Appl. No.: 648,763

[22] Filed: Jan. 31, 1991

[30] Foreign Application Priority Data

Feb. 13, 1990 [JP] Japan .................................. 2-29489

[51] Int. Cl.$^5$ .............................................. H04K 1/00
[52] U.S. Cl. ...................................... 375/1; 342/352; 342/357; 455/131
[58] Field of Search ............................ 375/1, 38, 102; 342/352, 357; 380/34; 455/12, 13, 134, 135, 136, 189, 191, 209, 303, 306, 12.1, 13.2, 189.1, 191.1

[56] References Cited

U.S. PATENT DOCUMENTS

| | | | |
|---|---|---|---|
| 4,468,793 | 8/1984 | Johnson et al. | 342/357 X |
| 4,509,198 | 4/1985 | Nagatomi | 455/189 X |
| 4,601,005 | 7/1986 | Kilvington | 375/1 X |
| 4,701,934 | 10/1987 | Jasper | 375/1 X |
| 4,956,864 | 9/1990 | Brockman | 455/136 X |
| 5,059,969 | 10/1991 | Sakaguchi et al. | 342/357 X |

Primary Examiner—Tod R. Swann
Attorney, Agent, or Firm—Sughrue, Mion, Zinn, Macpeak & Seas

[57] ABSTRACT

A GPS receiver comprising a plurality of demodulators. A satellite transmission search range is divided into as many frequency ranges as the demodulators so that one demodulator is assigned to one divided frequency range. Each demodulator searches a target satellite transmission within the frequency range assigned thereto. The GPS receiver of this construction significantly reduces the time required initially to capture the desired satellite transmission.

4 Claims, 3 Drawing Sheets

GPS RECEIVER

BACKGROUND OF THE INVENTION

1. Field of the Invention:

The present invention relates to a GPS (global position system) receiver capable of shortening the time required initially to capture satellite transmissions.

2. Description of the Prior Art:

Transmissions ($L_1$ wave) from GPS satellites are sent out at a frequency of 1575.42 MHz. Because the GPS satellites are not geostationary but orbiting satellites and because the GPS receiver is typically mounted on a moving body such as a vehicle for on-the-move signal reception, the Doppler-effect causes the receiving frequency of the transmission to fluctuate within a certain frequency range. Thus, to receive a desired satellite transmission requires changing the frequency within a predetermined satellite transmission search range in search for the target transmission, the search range covering the Doppler-shifted transmission variations.

FIG. 3 illustrates the construction of a typical prior art GPS receiver. In FIG. 3, reference numeral 1 is a multiplier for inverse diffusion; 2 is a multiplier for in-phase channel signal demodulation; 3 is a multiplier for orthogonal channel signal demodulation; 4 is a low pass filter that suppresses the harmonic component in the product from the multiplier 2 in order to obtain an in-phase channel signal I(t); 5 is a low pass filter that also suppresses the harmonic component in the product from the multiplier 3 so as to acquire an orthogonal channel signal Q(t); 6 and 7 are A/D converters that convert analog signals to digital format; 8 is a microcomputer for demodulation control; and 9 is a numerically controlled oscillator (NCO) controlled by the microcomputer 8.

The satellite transmission received with an antenna is converted to an intermediate frequency (IF) signal before being input to an input terminal of the multiplier 1 for inverse diffusion. Through another input terminal, the multiplier 1 admits PN code for identifying the target satellite. Maintaining the correlation between PN code and IF signal provides inverse diffusion and allows only the transmission from the target satellite to be extracted. The extracted signal is what is known as a PSK (phase shift keying) signal which is input to the multipliers 2 and 3.

The microcomputer 8 causes the NCO 9 successively to change the oscillation frequency thereof (reproduced carrier) in increments of a certain frequency range (usually a PLL capture range) throughout the entire satellite transmission search range established in advance. The multipliers 2 and 3 are supplied respectively with an in-phase component carrier and a 90° phase shifted orthogonal component carrier, both generated by the NCO 9. The two multipliers demodulate the components. As a result, the in-phase channel signal I(t) containing the harmonic component is output from the output terminal of the multiplier 2, and the orthogonal channel signal Q(t) also containing the harmonic component is output from the output terminal of the multiplier 3. The two outputs pass through the low pass filters 4 and 5 wherein the harmonic component is removed from each channel signal. This leaves the in-phase channel signal I(t) and orthogonal channel signal Q(t) demodulated, the in-phase signal being the original base band signal.

The microcomputer 8 calculates a demodulation intensity $I^2 + Q^2$ using the in-phase channel signal I(t) and the orthogonal channel signal Q(t) coming from the A/D converters 6 and 7, the demodulation intensity indicating the status of satellite transmission reception at a given point in time. The frequency at which the demodulation intensity $I^2 + Q^2$ is maximized is detected as the receiving frequency $f_c$ of the satellite transmission. The microcomputer 8 sets the oscillation frequency (reproduced carrier) of the NCO 9 to the receiving frequency $f_c$. Then a PLL loop is created on a software basis, the loop comprising the multipliers 2 and 3, the low pass filters 4 and 5, the A/D converters 6 and 7, the microcomputer 8, and the NCO 9. With the PLL loop established, the oscillation frequency of the NCO 9 (i.e., reproduced carrier) is locked in phase to the receiving frequency $f_c$.

One disadvantage of the prior art GPS receiver is that it takes considerable time initially to capture the desired satellite transmission because, as described, the search frequency is consecutively changed in increments of the PLL capture range throughout the entire satellite transmission search range in search of the target transmission.

SUMMARY OF THE INVENTION

It is therefore an object of the present invention to provide a GPS receiver that minimizes the time required initially to capture the target satellite transmission.

In carrying out the invention, there is provided a GPS receiver comprising a plurality of demodulators, wherein the satellite transmission search range is divided into as many frequency ranges as the demodulators so that one demodulator is assigned to one divided frequency range, each demodulator searching the target satellite transmission within the frequency range assigned thereto.

Because the desired satellite transmission is searched simultaneously within each of the divided frequency ranges, the time required initially to capture the transmission is reduced on average to the time with the prior art divided by the number of the partitioned frequency ranges (i.e., prior art time multiplied by 1/frequency range count).

DESCRIPTION OF THE PREFERRED EMBODIMENT

One preferred embodiment of the present invention will now be described with reference to the accompanying drawings.

Figure 1:
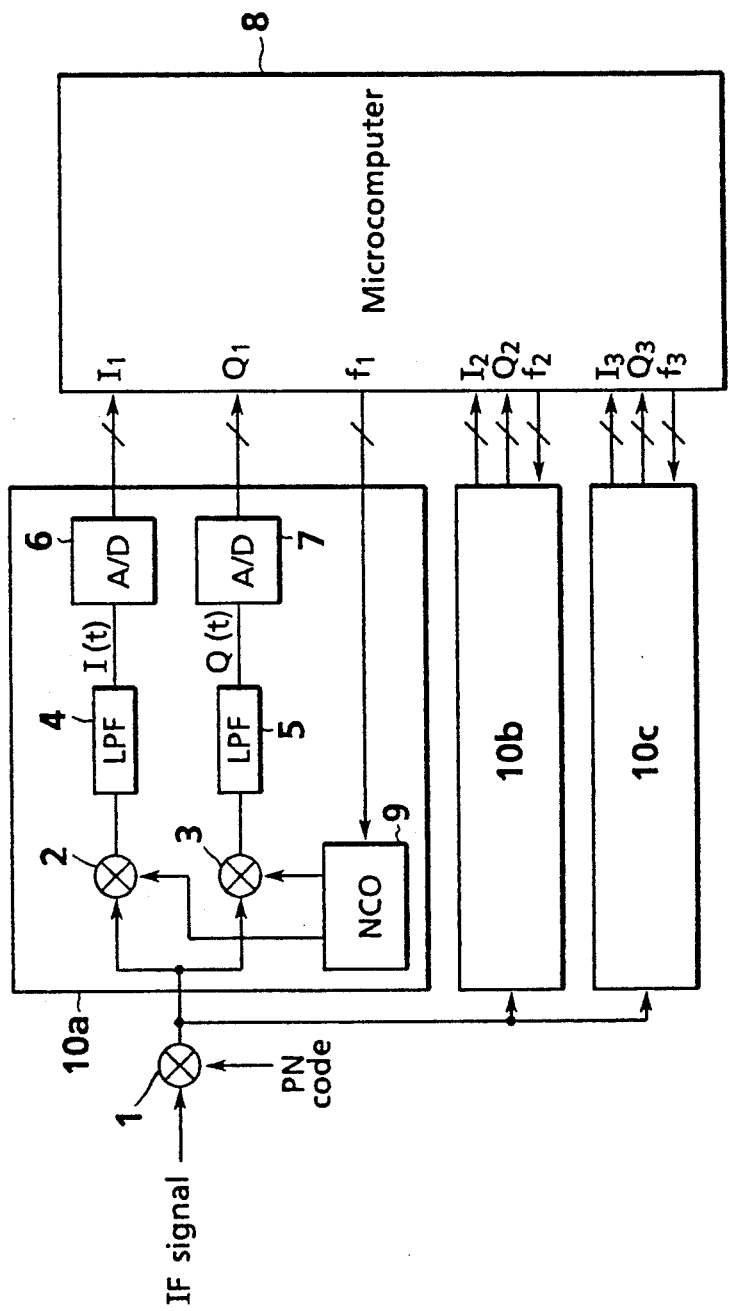
FIG. 1 is a block diagram of a GPS receiver embodying the present invention.
Figure 3:
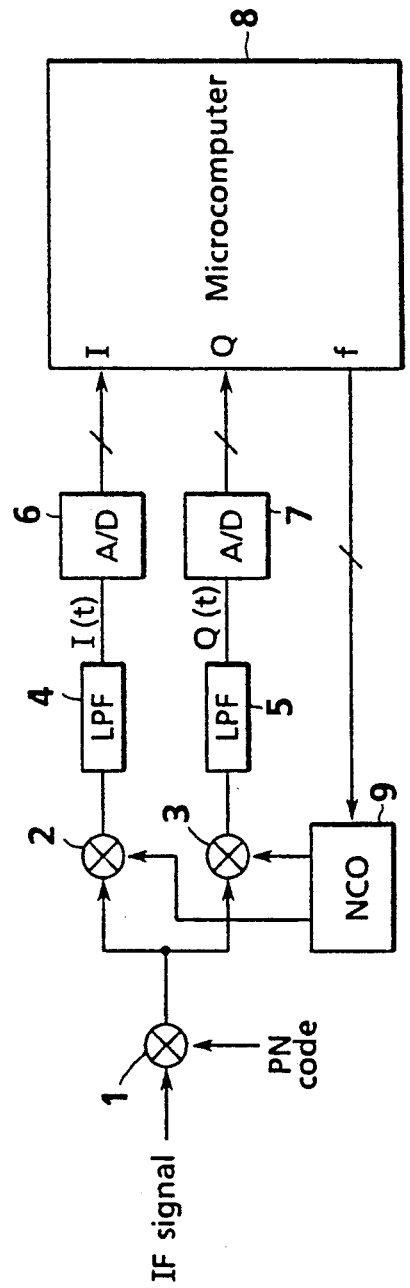
FIG. 3 is a block diagram of the typical prior art GPS receiver.

FIG. 1 illustrates the GPS receiver embodying the invention. In FIG. 1, reference numerals 10a, 10b and 10b designate demodulators having the same construction as that of demodulators 2 through 9 in FIG. 3. This embodiment comprises three demodulators.

Figure 2:
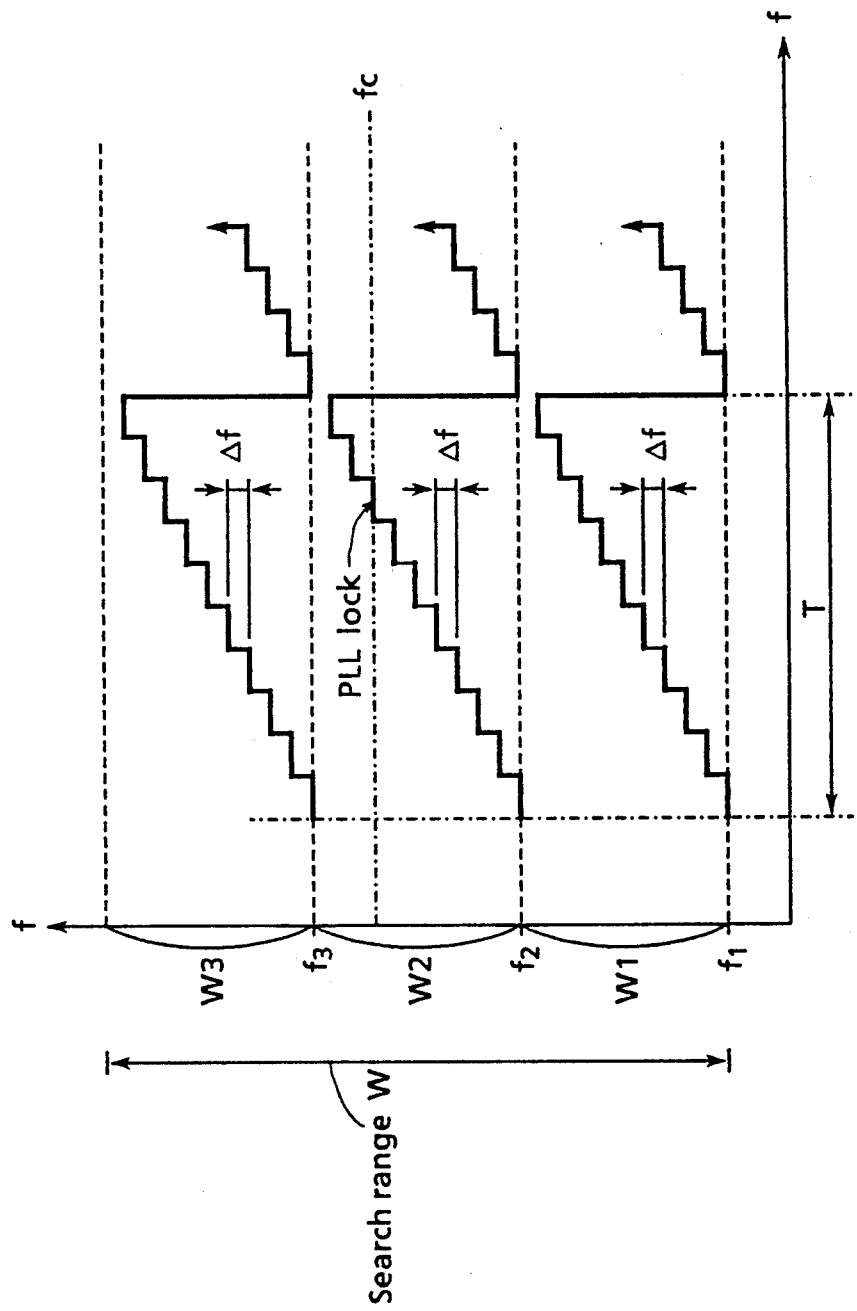
FIG. 2 is a view illustrating how the embodiment works.

In implementing the invention, the entire satellite transmission search range W is divided into three frequency ranges W1, W2 and W3, one for each demodulator, as depicted in FIG. 2. The first, second and third frequency ranges W1, W2 and W3 are assigned to the first, second and third demodulators 10a, 10b and 10c, respectively. As will be described later in more detail, the demodulators 10a, 10b and 10c search the target satellite transmission simultaneously in the respective frequency ranges W1, W2 and W3 under control of the microcomputer 8.

How the embodiment works will now be described with reference to FIG. 2. When satellite transmissions start getting received, the microcomputer 8 establishes the lowest frequency $f_1$ of the first frequency range W1 as the search start frequency of the NCO 9 in the first demodulator 10a, the lowest frequency $f_2$ of the second frequency range W2 as the search start frequency of the NCO 9 in the second demodulator 10b, and the lowest frequency $f_3$ of the third frequency range W3 as the search start frequency of the NCO 9 in the third demodulartor 10c. The oscillation frequency of each NCO 9 is consecutively changed in increments of a PLL capture range $\Delta f$ from each search start frequency upward. Thus the oscillation frequency of each NCO 9 is raised in a stepped manner within each of the frequency ranges W1, W2 and W3, as illustrated in FIG. 2.

A case may be assumed in which the receiving frequency of the satellite transmission is at a point $f_c$ in the frequency range W2. In that case, the second demodulator 10b captures the satellite transmission when the oscillation frequency of the NCO 9 in the second demodulator 10b reaches the frequency $f_c$.

As evident from FIG. 2, the use of three demodulators reduces a search period T covering the entire satellite transmission search range W to one third of the period with the prior art. That is, the time required to capture the target transmission with this embodiment is reduced on average to one third of the time with the typical prior art GPS receiver. The embodiment is a significant improvement in terms of search time over the prior art GPS receiver that changes the search frequency one frequency changing step at a time throughout the entire satellite transmission search range W.

With the above-described embodiment, the frequency from which to start searching the desired satellite transmission with each demodulator is set to each of the lowest frequencies $f_1$, $f_2$ and $f_3$ in the frequency ranges W1, W2 and W3, respectively. Alternatively, the search start frequency may be lowered in increments from the highest frequency downward. Another alternative is to oscillate the frequency in increments, up and down, around the center frequency of each frequency range. Needless to say, there may be provided any number of multiple demodulators depending on the application. Although the above embodiment uses demodulators under software control by microcomputer, this arrangement is by no means limitative of the invention. An alternative is to utilize prior art demodulators constituted by such discrete circuits as multipliers, low pass filters, loop filters and voltage controlled oscillators (VCOs).

As described and according to the invention, there is provided a GPS receiver comprising a plurality of demodulators, wherein a satellite transmission search range is divided into as many frequency ranges as the demodulators so that one demodulator is assigned to one divided frequency range, each demodulator searching a target satellite transmission within the frequency range assigned thereto. In this manner, the time required initially to capture the desired satellite transmission is significantly shortened.

It is to be understood that while the invention has been described in conjunction with a specific embodiment, it is evident that many alternatives, modifications and variations will become apparent to those skilled in the art in light of the foregoing description. Accordingly, it is intended that the present invention embrace all such alternatives, modifications and variations as fall within the spirit and scope of the appended claims.

What is claimed is:

1. A GPS receiver comprising a plurality of demodulators, wherein a satellite transmission search range for receiving a signal having a single predetermined carrier frequency sent by a target satellite is divided into as many frequency ranges as there are demodulators such that each demodulator is assigned to one divided frequency range, wherein a target satellite transmission is searched simultaneously within each of the divided frequency ranges by simultaneously varying respective receiving frequencies in each of the divided ranges.

2. A GPS receiver as defined in claim 1, wherein each of said respective receiving frequencies is varied in a stepwise fashion by an amount of a PLL capture range of $\Delta f$ starting from the lowest frequency within each of the divided frequency ranges upward.

3. A GPS receiver as defined in claim 1, wherein each of said respective receiving frequencies is varied in a stepwise fashion by an amount of a PLL capture range of $\Delta f$ starting from the highest frequency within each of the divided frequency ranges downward.

4. A GPS receiver as defined in claim 1, wherein each of said respective receiving frequencies is varied in a stepwise fashion by an amount of a PLL capture range of $\Delta f$ starting from the center frequency within each of the divided frequency ranges, and alternatively increasing and decreasing from the center frequency.

* * * * *